June 4, 1963     H. FRENK     3,092,002
SHUTTER FOR PHOTOGRAPHIC APPARATUS
Filed Sept. 23, 1960     5 Sheets-Sheet 1

INVENTOR
HELMUTH FRENK
BY *Toulmin & Toulmin*
Attorneys

INVENTOR
HELMUTH FRENK
BY Toulmin & Toulmin
Attorneys

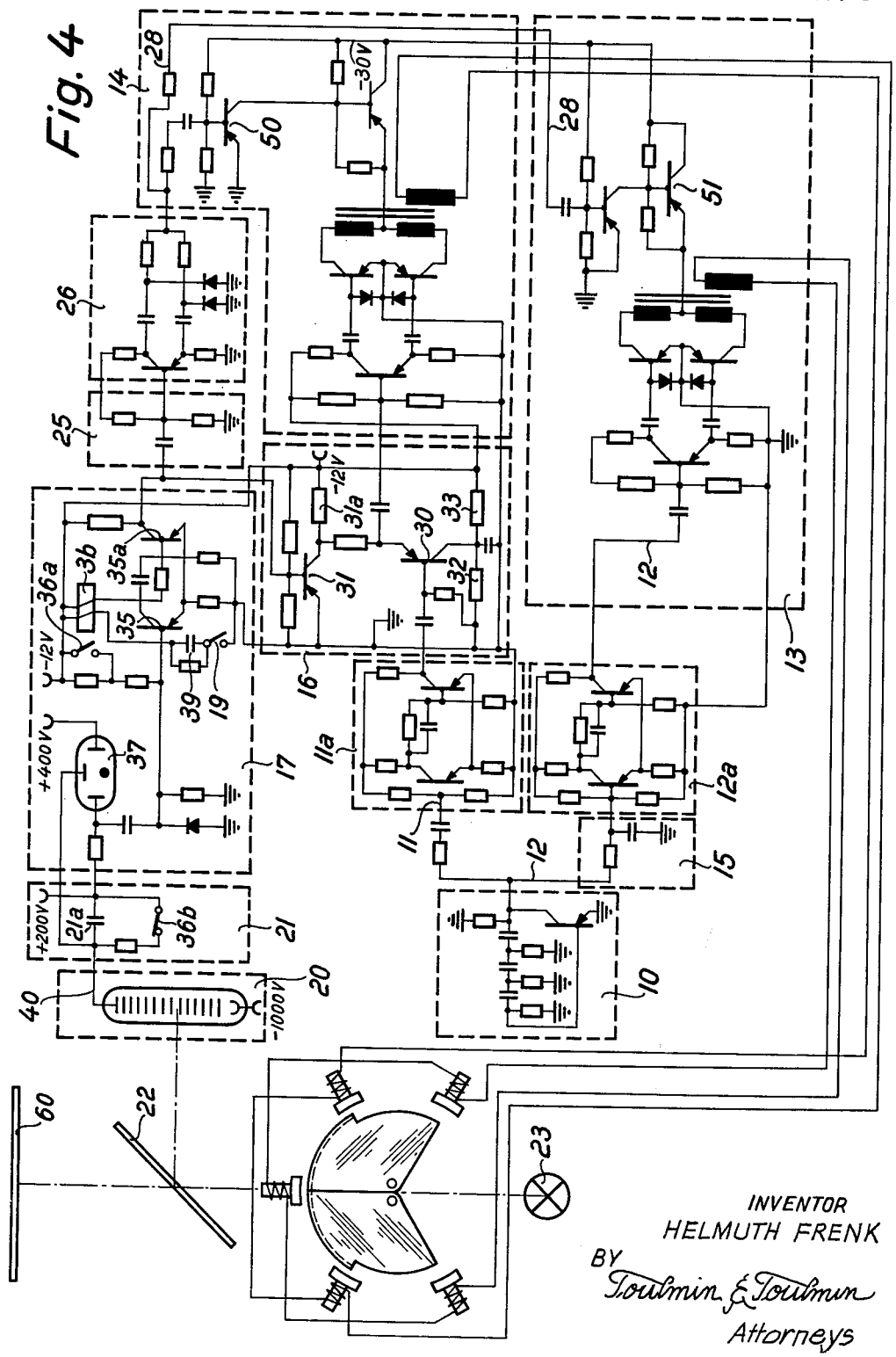

June 4, 1963  H. FRENK  3,092,002
SHUTTER FOR PHOTOGRAPHIC APPARATUS
Filed Sept. 23, 1960  5 Sheets-Sheet 5

Fig. 5

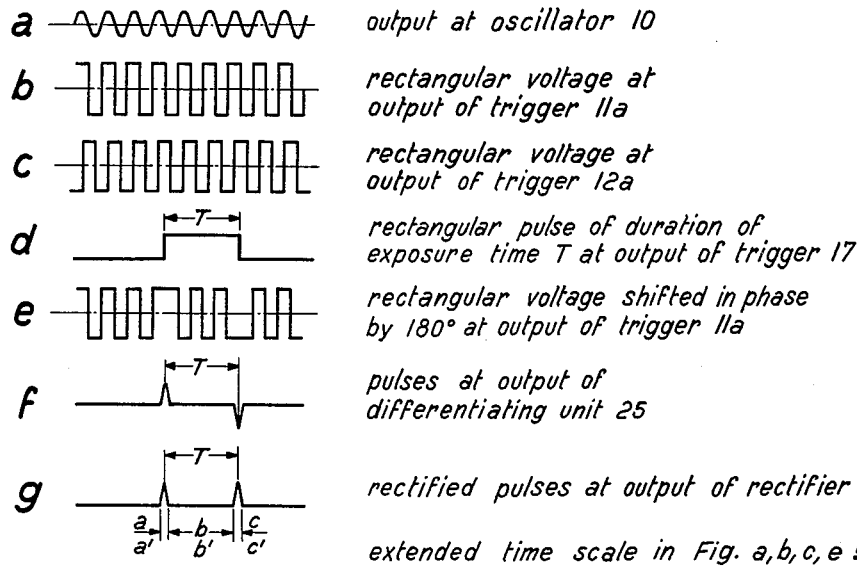

a — output at oscillator 10 b — rectangular voltage at output of trigger 11a c — rectangular voltage at output of trigger 12a d — rectangular pulse of duration of exposure time T at output of trigger 17 e — rectangular voltage shifted in phase by 180° at output of trigger 11a f — pulses at output of differentiating unit 25 g — rectified pulses at output of rectifier 26 extended time scale in Fig. a,b,c,e!
actually the frequency in these Fig.
is so high that the pulses in Fig. f, g
extend over some full periods. (see Fig. 6)

Fig. 6

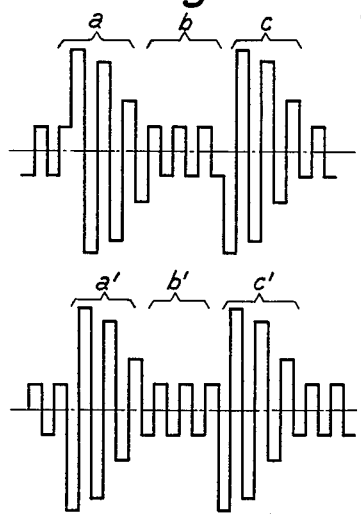

INVENTOR
HELMUTH FRENK
BY Toulmin & Toulmin
Attorneys

United States Patent Office 3,092,002
Patented June 4, 1963

3,092,002
SHUTTER FOR PHOTOGRAPHIC APPARATUS
Helmuth Frenk, 33 Gotenweg, Wetzlar (Lahn), Germany
Filed Sept. 23, 1960, Ser. No. 57,987
7 Claims. (Cl. 95—58)

The present invention relates to a shutter for photographic apparatus and more in particular to a shutter for photographic apparatus of the type wherein the shutter laminations or blades are opened and closed by magnetic forces.

It is known in the art to provide a shutter the laminations or blades of which are opened by the forces obtained from an electro-magnetic field. The transmission of the energy obtained from the field is, however, effected entirely mechanically. It will be apparent that such a shutter arrangement is rather complicated, requiring electrical drive means, and, in addition, mechanical transmission means.

It has therefore already been proposed to provide a shutter system for photographic apparatus wherein the shutter blades are moved directly by electric current supplied to the shutter blades. The shutter blades change their respective directions of movement between two or several pairs of poles as the current supplied to the shutter blades is reversed.

It is the object of the present invention to further improve the operation of electrically actuated shutter blades so as to greatly increases the swiftness and accuracy of the opening and closing of the shutter with a minimum of structural elements.

Other objects and advantages will become apparent as the description proceeds.

Such objects are achieved by the present invention according to which the shutter blades are associated with a plurality of electric magnets supplied with a phase shifted current, and wherein the blades form an armature of the electric magnets. The electric magnets comprise, for example, a pair of shutter blades, and a plurality of electric magnets peripherally spaced about the shutter blades and producing at least two rotary fields of opposite directions, with said shutter blades being disposed each in one of said rotary fields, so as to be urged in opposite directions. Furthermore, means are provided for temporarily phase shifting the voltage supplied to some of said electric magnets by 180°, thereby reversing the sense of rotation of said rotary fields, so that the shutter blades are either urged together, to form the closed position of the shutter, or else are moved apart to form the opening position of the shutter.

It is furthermore advantageous to provide means for temporarily increasing the supply voltage fed to the electric magnets during the opening and closing operation of the shutter. In that way the ordinary, comparatively small voltage constantly supplied to the electric magnets just sufficiently actuates the armature-shutter blades to maintain them either in the opened or in the closed position, whereas a more powerful supply voltage is available in order to instantaneously and very swiftly move the shutter blades from the closed position to the opened position and vice versa.

The shutter blades are preferably shaped to form the surface of a segment of a cylinder.

Further advantageous features of the invention will become apparent upon the following description of the accompanying drawings, wherein:

FIGURE 4 is a wiring diagram showing the conventional details of the electrical elements of diagram 3;

FIGURE 5 is a diagram illustrating the development of the voltages in the circuits of the invention; and FIGURE 6 is a diagram illustrating voltage peaks for rapidly opening and closing the shutter.

Figure 1:
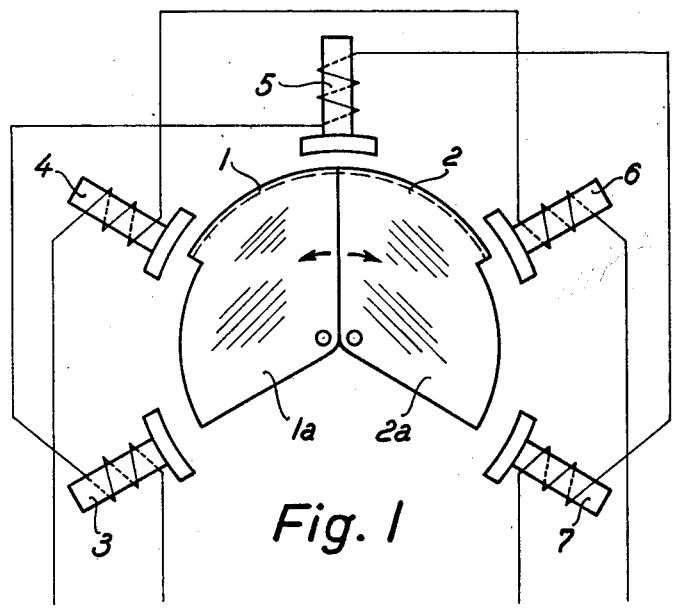
FIGURE 1 is a schematic view showing a pair of shutter blades and, peripherally spaced, thereabout electric magnets.
Figure 1A:
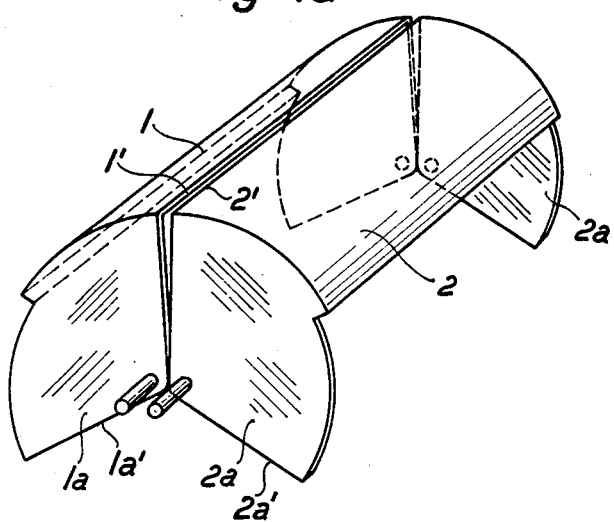
FIGURE 1a is a perspective view of cylinder segment shaped shutter blades with their respective support portions according to the invention.
Figure 2:
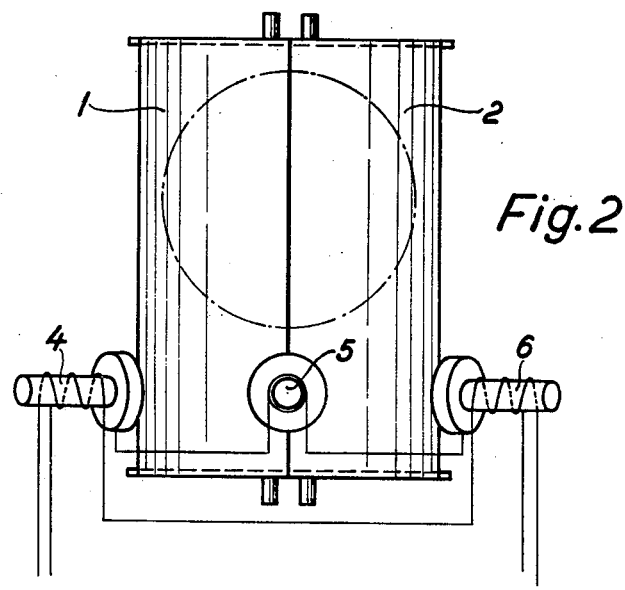
FIGURE 2 is a front elevation view of the shutter blade arrangement according to the invention.

Referring now to the drawings more in detail, FIGURES 1 and 1a show a pair of shutter laminations or blades 1 and 2, forming an integral structure with their respective support members 1a and 2a. The blades 1 and 2 are shaped as the surface of a sector of a cylinder, comprising, e.g., a sector angle of about 60°. The support portions 1a and 2a comprise, e.g., a sector angle of about 120°. The blades 1 and 2 are composed, e.g., of an electrically conductive, non-magnetic material. In the opening position of the shutter the edges 1a' and 2a' contact one another, and the edges 1' and 2' of blades 1 and 2 are removed from one another by, e.g., 60°, so as to allow for the passage of light rays in order to effect an exposure.

According to the invention, the opening and closing of the shutter blades 1, 2 is effected by means of electric magnets such as magnets 3, 4, 5, 6, 7, having coils 3a, 4a, 5a, 6a, 7a, respectively. As shown in FIGURE 1, the plurality of coils 3, 5, 7 are connected in series and form one group of magnets, another group of magnets being formed by the pair of electric magnets 4 and 6, also connected in series. It is, of course, possible to provide additional electric magnets. As will be seen in FIGURE 1, the pair of magnets 4 and 6 are spaced in alternating fashion with the plurality of magnets 3, 5, 7, i.e. with each one of the pair of magnets being disposed between two of the plurality of magnets 3, 5, 7. All magnets are peripherally spaced about the shutter blades 1, 2.

According to the invention, the electric magnets produce rotary fields actuating the shutter blades, which latter thus operate in the manner of the armature of an induction motor, in such a manner, that the shutter blades are either moved apart, whereby the shutter is opened and an exposure can be effected, or they are moved together to assume the closed position illustrated in FIGURE 1. This is effected by structure and in a manner to be described presently, and comprising means for supplying an A.C. to the electric magnets, phase shifting the current through magnets 4, 6 by 90° relative to the current through magnets 3, 5, 7. Furthermore, there are provided means for commutating the current in one of the two series of magnets 4, 6, and 3, 5, 7 by 180° with respect to the other one of these two series at the beginning and the end of each exposure, so as to reverse the sense of rotary movement of the armature-shutter blades 1, 2.

Figure 3:
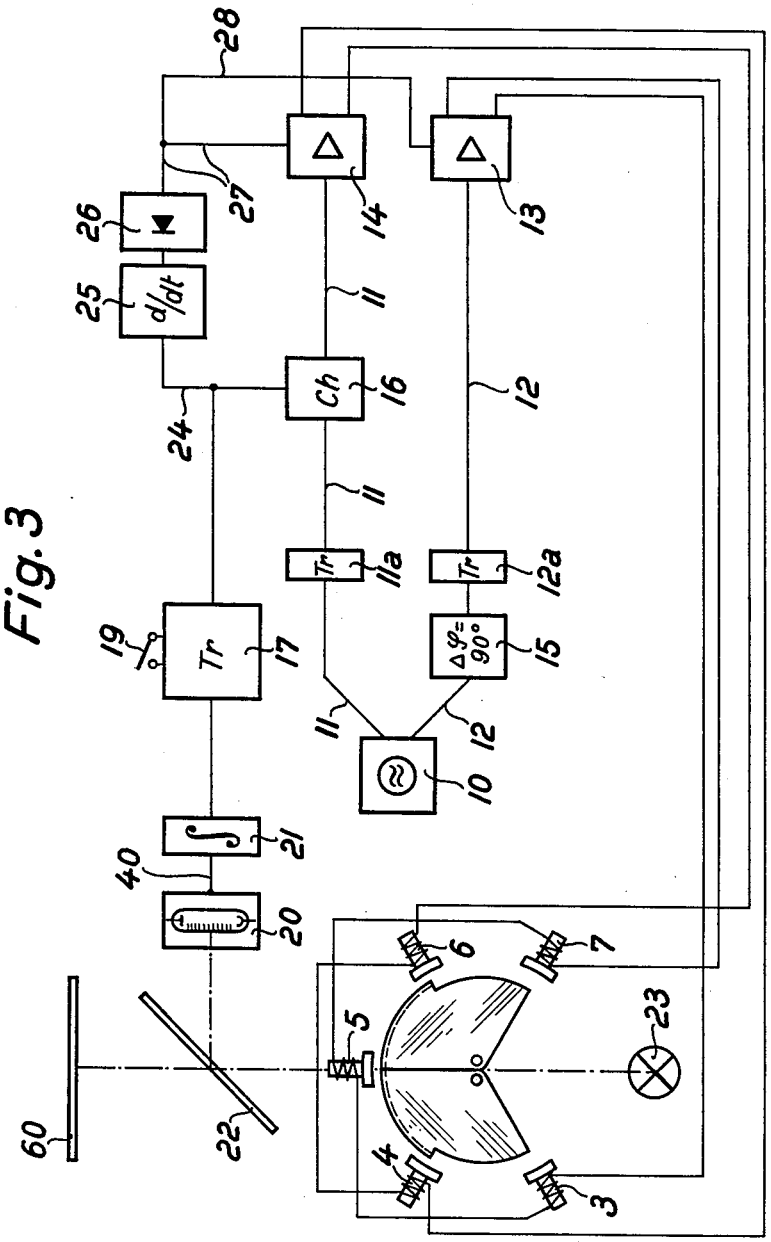
FIGURE 3 is a wiring diagram illustrating the electrical structure and circuits of the shutter system according to the invention.

All this structure is shown generally in FIGURE 3 and in more detail in FIGURE 4, wherefrom it will be seen that there is provided a suitable A.C. source, as for example an oscillator 10, producing an alternating voltage, which is supplied to lines 11 and 12, of a first and a second circuit, respectively. In the first circuit line 12 leads to phase shifter 15, which shifts the phase of the alternating current in this circuit by 90° relative to the current produced in oscillator 10. The two circuits further comprise triggers 11a, 12a, which transform the alternating voltage into a rectangular voltage. The output of trigger 12a in the first circuit is series connected with an amplifier, as, for instance, a push-pull terminal amplifier 13, which latter is connected, in turn, with the coils 3a, 5a, 7a of electric magnets 3, 5, 7. The output of trigger 11a in the second circuit is connected with a chopper 16, which latter is connected with push-pull terminal amplifier 14, connected with coils 4 and 6. The chopper 16 is provided for effecting the commutation of the rectangular voltage to be supplied to amplifier 14 at the beginning and at the end of each exposure, so as to reverse thereby the sense of actuation of the shutter blades for being moved from the closed position to the opened position and vice versa. For the accurate timing of the operation of chopper 16 special means are provided comprising, for example, a beam splitter 22 located in the path of rays of exposure-light source 23, and, connected in series with one another, a multiplier 20, an integrating unit 21, and a trigger 17, the latter having an associated starting button 19, and being connected with chopper 16. The multiplier receives light rays from the light source 23 via beam splitter 22 during exposure.

The invention also envissages means for greatly increasing the voltages fed to the electric magnets and hence the driving forces exerted on the shutter blades at the respective moments of opening and closing of the latter. For this purpose the output of trigger 17 is also connected with a differentiating unit 25 via line 24, unit 25 being series connected with full-wave rectifier 26. The elements 25 and 26 supply pulses of equal polarity to the amplifiers 13, 14 at the moment of commutation effected by chopper 16, thereby greatly increasing the feed voltage of the amplifiers supplied to the electric magnets. As a consequence, the shutter blades receive a greater rotary drive at the moments of opening and closing of the shutter blades.

The operation is as follows:

The oscillator 10 produces an alternating voltage, with the duration of the cycles being small relative to the smallest time of exposure, as, for instance, 10 kilocycles with a smallest time of exposure of T=$\frac{1}{1000}$ second (see FIGURE 5 line a). The alternating voltage is fed to triggers 11a and 12a in the first and second circuits, respectively, in the first circuit after having passed through phase shifter 15 and having been shifted by 90°. At the outputs of triggers 11a, 12a, rectangular voltages are obtained of higher power, the output of trigger 12a having been shifted by 90° (FIGURE 5, lines a and b), which are then passed via line 11 and chopper 16, and via line 12, respectively to amplifiers 13 and 14, respectively. Amplifiers 13, 14 have a small feed voltage, and a comparatively small voltage is supplied to coils 4 and 6.

Since rectangular voltages are supplied to amplifiers 13, 14, with a phase shift of 90°, the coils 3, 4, 5 and 5, 6, 7 form rotary fields which normally tend to move blade 1 in clockwise direction and blade 2 in counter-clockwise direction, so that blades 1 and 2 are urged against each other. Consequently, the shutter remains in closed position. The comparatively small voltage applied to the magnetic coils is entirely sufficient for the latter purpose.

For an opening of the shutter two requirements must be met. In the first place, the sense of rotation of the fields produced by the magnetic coils must be reversed, in order to move the blades 1 and 2 apart. In addition, it is highly advantageous to provide for an increase of the supply voltage fed to the magnetic coils.

The sense of rotation of the fields produced by the electric magnets is reversed by commutating the voltage in one of the two circuits by 180°, which is done by means of the chopper 16. The chopper 16 may comprise, for instance, a chopper transistor 30, a further transistor 31, resistances 32, 33, and further conventional capacitors and resistances as illustrated in FIGURE 4. Transistor 31, resistor 31a, and resistances 32, 33 are connected to form a bridge circuit, with the chopper transistor 30 in its output, the collector of which receiving about half of the feed voltage.

If the transistor 31 blocks, the emitter of chopper transistor 30 has a negative voltage relative to the collector, and a voltage, shifted in phase by 180° relative to the basis of the chopper transistor, is supplied to amplifier 13 (FIGURE 5, line e). If, on the other hand, transistor 31 is conducting, the emitter of chopper transistor 30 is positive relative to the collector, and a cophasal voltage is supplied to amplifier 13. The commutation of the current in coils 4 and 6 is thus effected by alternatingly opening and blocking transistor 31. This actuation of transistor 31 can be done either manually or automatically, as, for example, by trigger 17 comprising, e.g., trigger-transistors 35 and 35a, a relay 36, a relay tube, e.g. a cold cathode-thyratron 37, and a starting button 19. By pressing button 19, a capacitor 39 is charged via a coil of relay 36, whereupon the relay operates switches 36a, 36b, switch 36a operating the trigger and switch 36b releasing capacitor 21a for becoming charged. Due to the operation of the trigger, relay 36 is maintained in its closed position and, at the same time, transistor 31 becomes conductive. Consequently, the current through coils 4 and 6 is commutated and the shutter is opened.

The shutter is closed in the following manner:

A portion of the light rays emitted by light source 23 through the opened shutter toward the film or photographic plate 60 is deflected by beam splitter 22 towards multiplier 20. The latter then supplies a current to integrating unit 21, via line 40. The integrating unit may comprise, e.g., a capacitor 21a whose capacity is in inverse proportion to the sensitivity of the photographic material to be exposed. Unit 21 is connected with relay tube 37 which is ignited after a predetermined voltage has been reached. Trigger transistor 35 then receives a strong positive pulse and is again operated, thereby blocking transistor 31. Thus, the current through coils 4 and 6 is again commutated and the shutter is closed. Also, relay 36 is closed.

In their respective resting positions, either opened or closed, the shutter blades are maintained by a comparatively small force and it is therefore sufficient to supply a comparatively small alternating current to coils 3, 5, 7 and 4, 6. A greater torque is desirable for opening and closing the shutter with a view to reduce the duration of the opening and closing process as much as possible.

It therefore becomes necessary to pass an elevated alternating current through the coils. This can be done by increasing the feed voltage to amplifiers 13 and 14, which, in turn, is effected by producing a pulse and supplying the same to the amplifiers. The pulse is produced by feeding the rectangular pulse having the same duration as the time of exposure T (FIGURE 5 line d) not only to chopper 16, as described further above, but, in addition, to differentiating unit 25 via line 24. The rectangular pulse is differentiated in unit 25 and thereby a positive pulse and a negative pulse both of small duration are obtained (FIGURE 5, line f). The pulses are rectified in full-wave rectifier 26 (FIGURE 5 line g), which pulses are then supplied, via lines 27, 28 to the amplifier 13, 14, whose feed voltages are instantaneously increased. As a result, the output of the amplifiers and hence the supply voltages to the electric magnets is correspondingly increased, and the blades 1, 2 are moved with great power from their closed positions to their opened positions, and vice versa.

The highly advantageous voltage increase for effecting a very rapid opening and closing of the shutter is illustrated in FIGURE 6, wherein zone a represents the rectangular peak voltage during the first pulse of FIG. 5g for quickly opening the shutter blades in the coils 3', 5', 7', e.g. whereas zone a' represents the zone of phase-shifted, increased voltage in coil 4' and 6', e.g., in zones b and b' a reduced voltage is sufficient for maintaining the shutter open. In zones c and c' the shutter blades are rapidly closed by the increased voltages.

It will be understood that this invention is susceptible to modification in order to adapt it to different usages and conditions and, accordingly, it is desired to comprehend such modifications within this invention as may fall within the scope of the appended claims.

What I claim is:

1. A shutter for photographic apparatus comprising a pair of shutter blades, an A.C. source, a first circuit connected with said A.C. source, a plurality of series connected electric magnets in said first circuit, phase shifting means in said first circuit displacing the phase of current as supplied by said A.C. source by 90°, amplifier means in said first circuit, a second circuit connected with said A.C. source, amplifier means and another plurality of series connected electric magnets in said second circuit, said second plurality of electric magnets being disposd in alternating spaced arrangement with said first plurality of electric magnets, and all of said magnets being spaced peripherally about said shutter blades.

2. A shutter for photographic apparatus according to claim 1, wherein said blades consist of electrically conductive but non-magnetizable material.

3. A shutter for photographic apparatus according to claim 1, with said blades being shaped as the surface of a sector of a cylinder.

4. A shutter for photograhic apparatus according to claim 1, further comprising, in said first circuit, series connected between said phase shifting means and said amplifier means, means for transforming the alternating current in said first circuit into a rectangular alternating current.

5. A shutter for photographic apparatus according to claim 1, further comprising, in said first circuit, series connected between said phase shifting means and said amplifier means, means for transforming the alternating current in said first circuit into a rectangular alternating current, chopper means series connected with said amplifier means in said second circuit and shifting the rectangular current in phase by 180°.

6. A shutter for photographic apparatus according to claim 5, further comprising means for producing a rectangular control pulse from the beginning to the end of an exposure and feeding said pulse to said chopper means, with said pulse causing said chopper means to shift the current in said second circuit in phase by 180° for the respective duration of such pulse, using the chopper for commutator.

7. A shutter for photographic apparatus according to claim 6, further comprising differentiating and rectifying means connected with said control pulse producing means for converting the control pulse into two pulses of small duration and feeding the latter to said amplifying means, thereby greatly increasing the output of the latter.

References Cited in the file of this patent
UNITED STATES PATENTS
2,702,500     De Bell _____ Feb. 22, 1955